United States Patent [19]
Kapinos et al.

[11] Patent Number: 5,173,596
[45] Date of Patent: Dec. 22, 1992

[54] PAPER CARD READER/VALIDATOR

[75] Inventors: Mark E. Kapinos, Shrewsbury, Pa.; Robert H. Tegtmeier, Phoenix, Md.

[73] Assignee: General Instrument Corporation, Hatboro, Pa.

[21] Appl. No.: 665,673

[22] Filed: Mar. 7, 1991

[51] Int. Cl.⁵ .......................................... G06K 13/00
[52] U.S. Cl. ................................. 235/475; 235/456; 235/480; 271/122; 271/274; 346/140 R
[58] Field of Search ............... 235/475, 477, 478, 456; 271/272, 273, 274, 902, 122; 364/412

[56] References Cited

U.S. PATENT DOCUMENTS

| | | | |
|---|---|---|---|
| 3,745,312 | 7/1973 | Ladine et al. | 235/475 R |
| 4,322,612 | 3/1982 | Lange | 235/419 |
| 4,552,352 | 11/1985 | Nickels, Jr. et al. | |
| 4,589,650 | 5/1986 | Miyoshi | 271/242 |
| 4,613,747 | 9/1986 | McCarthy | 235/477 |
| 4,626,672 | 12/1986 | Sapitowicz et al. | 255/480 |
| 4,695,171 | 9/1987 | Sapitowicz | |
| 5,052,836 | 10/1991 | Genno | 271/122 |

FOREIGN PATENT DOCUMENTS

0204887 8/1990 Japan ................... 235/475

Primary Examiner—John W. Shepperd
Assistant Examiner—Esther Chin
Attorney, Agent, or Firm—Barry R. Lipsitz

[57] ABSTRACT

A card reader and validator for use in wagering terminals includes a housing with a paper path. A paper drive surface of a drive wheel projects into the paper path. A platen assembly includes a pressure roller for pressing paper against the paper drive surface of the drive wheel and a platen surface for pressing paper agianst the paper path at a processing zone. The platen assembly is pivotally mounted to the housing in a manner such that it is biased toward the paper path when the drive wheel rotates in one direction and is lifted away from the paper path when the drive wheel rotates in the opposite direction. Corresponding ribs in the platen surface and paper path flatten the paper in the processing zone to facilitate the reading of optical marks on the paper by optical sensors. An ink jet printhead is provided for printing indicia on a portion of paper traveling through the paper path. A wick mounted to the platen assembly absorbs ink from the ink jet printhead during a purge cycle.

21 Claims, 5 Drawing Sheets

PAPER CARD READER/VALIDATOR

BACKGROUND OF THE INVENTION

The present invention relates generally to paper transport mechanisms, and more particularly to a card reader and validator adapted for use in a wagering terminal or the like.

Paper card readers are useful in a variety of applications. One such application is to read cards which have been marked to place bets at a wagering facility such as a racetrack. Cashier operated and self-service lottery terminals are also available where cards are marked to designate a set of numbers for the purchase of a lottery ticket. The marks are made by darkening one or more designated areas on the card with a pencil. The card reader optically detects the darkened areas and interprets the pattern in accordance with well known techniques. Examples of prior art card reader/validators can be found in U.S. Pat. Nos. 4,626,672 to Sapitowicz et al, entitled "Document Processing Apparatus" and 4,322,612 to Lange, entitled "Self-Service Wagering System".

Card readers are used in wagering applications both for the placing of bets and for reading paper tickets after a race in order to automate the payoff of winning bets. In the latter mode of operation, a winning patron inserts his ticket into the card reader, which optically reads markings such as a bar code on the ticket and forwards data indicative of the marking to a host computer for verification and calculation of the payoff. The host computer then sends a signal back to the wagering terminal authorizing payment on the winning ticket.

A card reader can also include a "validator" that prints an indicia on a ticket to indicate that the ticket has already been redeemed. The validator can imprint a designation such as "paid" or 10 "canceled" on a winning ticket, or can obliterate a bar code or the like necessary to the processing of the ticket.

The provision of validation in card readers has presented various problems. In some prior art devices, ink propagates from the validator portion of the card reader to the optical portions that read marks from a card. This interferes with the proper operation of the card reader. Stray ink can also offset onto a card used for placing a bet. When this happens, errors can result if the ink is present in the area of the card that is marked to place the bet. Stray ink can also contaminate mechanical components, reducing the reliability of the card reader mechanism.

Card readers are also subject to paper jams. In many prior art systems, such as that disclosed in U.S. Pat. No. 4,626,672 cited above, the paper card or ticket is inserted into a first slot and travels in a semicircular path for exit from a second slot. User access to the paper path is restricted, and jams are difficult to clear, particularly when they occur in the semicircular area between the entry and exit slots. A paper jam can result in substantial down time for a terminal, resulting in loss of revenues to a wagering facility as well as customer frustration.

It would be advantageous to provide a card reader/validator for a lottery or wagering terminal that overcomes the above-noted problems of prior art devices. Such a card reader/validator should function in both automated, self-service terminals as well as in terminals operated by tellers employed by the lottery or wagering facility.

It would be particularly advantageous to provide a card reader/validator that is resistant to paper jams, and is easily cleared should a jam occur. In order to achieve this result, it would be advantageous to provide the card reader/validator with a straight paper path that is as short as possible. It would be further advantageous to provide components of the paper drive mechanism that can be pivoted away from or completely removed from the paper path to facilitate the removal of any paper jams that occur.

It would be further advantageous to provide a card reader/validator that is actuated to transport a paper card or ticket by the insertion of the card or ticket into a slot. It would be still further advantageous to provide for the bidirectional transport of a paper card or ticket inserted into the slot, for reading, verifying, and/or validating the card or ticket.

The present invention provides a jam resistant card reader/validator enjoying the above-mentioned advantages.

SUMMARY OF THE INVENTION

In accordance with the present invention, apparatus is provided for transporting a paper card or ticket across a processing zone. The apparatus comprises a housing including a paper path, and means having a paper drive surface for driving paper through the paper path. A platen assembly includes a pressure roller for pressing paper against the paper drive surface and a platen surface for pressing paper against the paper path at the processing zone. Means are provided for pivotally mounting the platen assembly to the housing, wherein the platen surface is biased toward the paper path when the paper drive surface advances in one direction and is lifted away from the paper path when the paper drive surface advances in the opposite direction.

The processing zone can comprise an optical mark reader having a plurality of sensors for detecting marks provided in columns along the length of paper traveling through the paper path. The platen surface can comprise a plurality of parallel ribs defining channels corresponding to the sensors. The ribs function to flatten paper traveling through the paper path when the platen surface is biased toward the paper path. Drive means are provided for advancing the paper drive surface. Control means, responsive to the optical mark reader, actuate the drive means to advance the paper drive surface upon the sensing of a leading edge of paper by the reader. In a preferred embodiment, the plurality of channels defined by the parallel ribs on the platen surface have an interior surface that provides a substantial contrast with a leading edge of paper to facilitate the sensing of the leading edge by the reader.

In order to clear paper jams, means are provided to enable the platen assembly to be snapped into and out of the housing. The pivotal mounting of the platen assembly to the housing also facilitates the clearance of paper jams. In an illustrated embodiment, the platen surface comprises a wedge shaped member having a rear portion carrying the pressure roller and tapering into a front edge that forms a mouth with the paper path for receiving paper to be transported. The mouth provides a larger opening when the platen surface is lifted away from the paper path than when the platen surface is biased against the paper path. Clutch means, operatively associated with the pressure roller and wedge shaped member, enable rotation of the pressure roller to continue after the platen surface has been fully lifted away from or biased against the paper path.

A protective cover is provided for the platen assembly. Means are provided for mounting the protective cover to the housing, for pivotally mounting the platen surface in the cover, and for mounting the pressure roller in the cover. In a preferred embodiment, the protective cover is pivotally mounted to the housing.

A card reader and validator for use in wagering terminals or the like is also provided. The card reader and validator comprises a housing including a paper path. A drive wheel has a paper drive surface that projects into the paper path. A platen assembly includes a pressure roller for pressing paper against the paper drive surface of the drive wheel and a platen surface for pressing paper against the paper path at a processing zone located within the paper path. The platen assembly is pivotally mounted to the housing, wherein the platen surface is biased toward the paper path when the drive wheel rotates in one direction and is lifted away from the paper path when the drive wheel rotates in the opposite direction.

An ink jet is provided in the card reader and validator for printing indicia on a portion of paper traveling through the paper path. A wick is provided for absorbing ink from the ink jet during a purge cycle. Means are provided for mounting the wick to the platen assembly.

The platen surface of the card reader and validator can comprise a plurality of parallel ribs that function to flatten paper traveling through the paper path when the platen surface is biased toward the paper path. The ribs define channels that are aligned with a plurality of optical mark sensors in the processing zone. Drive means are provided for rotating the drive wheel. Control means, responsive to a leading edge sensor, actuate the drive means to rotate the drive wheel upon sensing a leading edge of paper placed in the paper path. The leading edge sensor can comprise at least one of the optical mark sensors in the processing zone.

In a preferred embodiment of the card reader and validator, the platen surface comprises a wedge shaped member having a rear portion carrying the pressure roller and tapering into a front edge that forms a mouth with the paper path for receiving paper to be transported. The mouth provides a larger opening when the platen surface is lifted away from the paper path than when the platen surface is biased against the paper path. Clutch means, operatively associated with the pressure roller and wedge shaped member, allow the pressure roller to continue to rotate after the platen surface has been lifted away from or biased against the paper path.

DETAILED DESCRIPTION OF THE INVENTION

Figure 1:
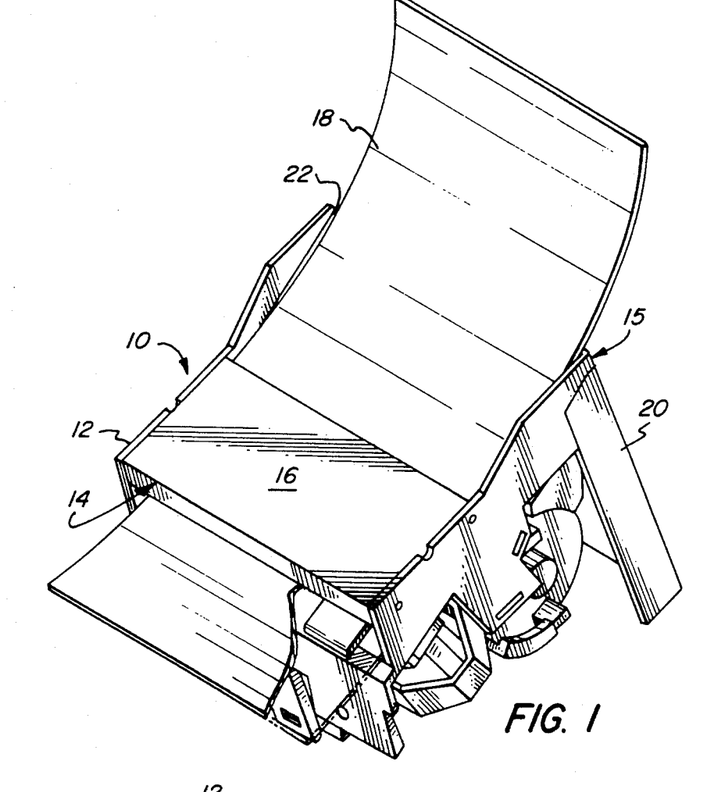
FIG. 1 is a perspective view of a card reader/validator in accordance with the present invention.

A card reader generally designated 10 in accordance with the present invention is illustrated in perspective form in FIG. 1. This device can be installed into a wagering terminal or the like. Alternatively, the card reader/validator 10 can be provided as a stand alone device with the addition of suitable covers.

Card reader/validator 10 comprises a housing generally designated 15 that includes a paper transport section 12 and a rear support section 20. A card or paper ticket 18 is transported by the card reader/validator 10 through a paper path 22 so that optical marks contained on the card or ticket can be read and/or for validating the card or ticket by printing indicia thereon.

A platen assembly generally designated 14 provides a mouth in which to insert paper 18 and biases the paper against a drive wheel during the paper transport operation. Platen assembly 14 includes a cover 16 that houses a wedge shaped pivotally mounted platen surface 80 containing a pressure roller 30, as best illustrated in FIGS. 5–10.

Figure 2:
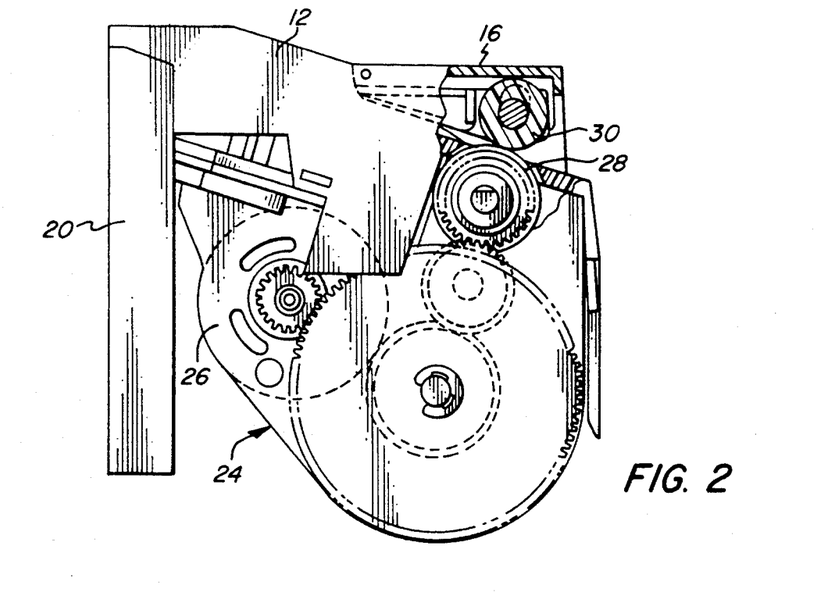
FIG. 2 is a side view of the card reader/validator with portions broken away to illustrate the motor and drive components.

Paper is transported through paper path 22 via a drive·wheel 28 that provides a resilient paper drive surface such as rubber. Various rubber formulations are well known in the art for driving paper and cardstock. Drive wheel 28 is driven by a DC motor 26 via a gear arrangement generally designated 24. Pressure roller 30 carried by platen surface 80 presses paper against the paper drive surface of drive wheel 28 when paper is transported through the paper path.

Paper path 22 includes a plurality of parallel ribs 32 that define channels 38 corresponding to a plurality of sensors 42, 43 in an optical assembly 40. Sensors 42, 43 can comprise any known sensor for optically reading marks. For example, each sensor can include a light emitting diode ("LED") and a corresponding photodetector for detecting the presence or absence of light from the LED reflected off of a paper card or ticket surface. Such reflection will be detected from white areas of the paper and will not be detected where dark marks (e.g., pencil marks or printed bar code lines) are present.

Optical assembly 40 is mounted in a processing zone 41 of housing 15 for detecting marks provided along the length of paper traveling through paper path 22. In a preferred embodiment, sensors 42 are provided to read the marks in fourteen vertical columns of a wagering card processed by the card reader/validator. Sensors 43 are provided to detect printed alignment marks at the edges of the wagering card. By detecting the printed alignment marks, software compensation can be provided to enable sensors 42 to accurately read marks entered by a patron placing a bet via a wagering card even if the card is skewed as it travels through paper path 22. Such software compensation or "twin strobe deskewing" techniques are well known in the art. Sensors 42 are also used to read bar codes or other printed indicia on wagering tickets that are processed by the card reader/validator 10 for redemption. Such bar codes can be provided either vertically along the length of a ticket or horizontally across the ticket as well known in the art. Depending on the bar code configuration, one or more of sensors 42 will be used to detect the bar code markings and forward the bar code information to a microprocessor for interpretation.

Figure 3:
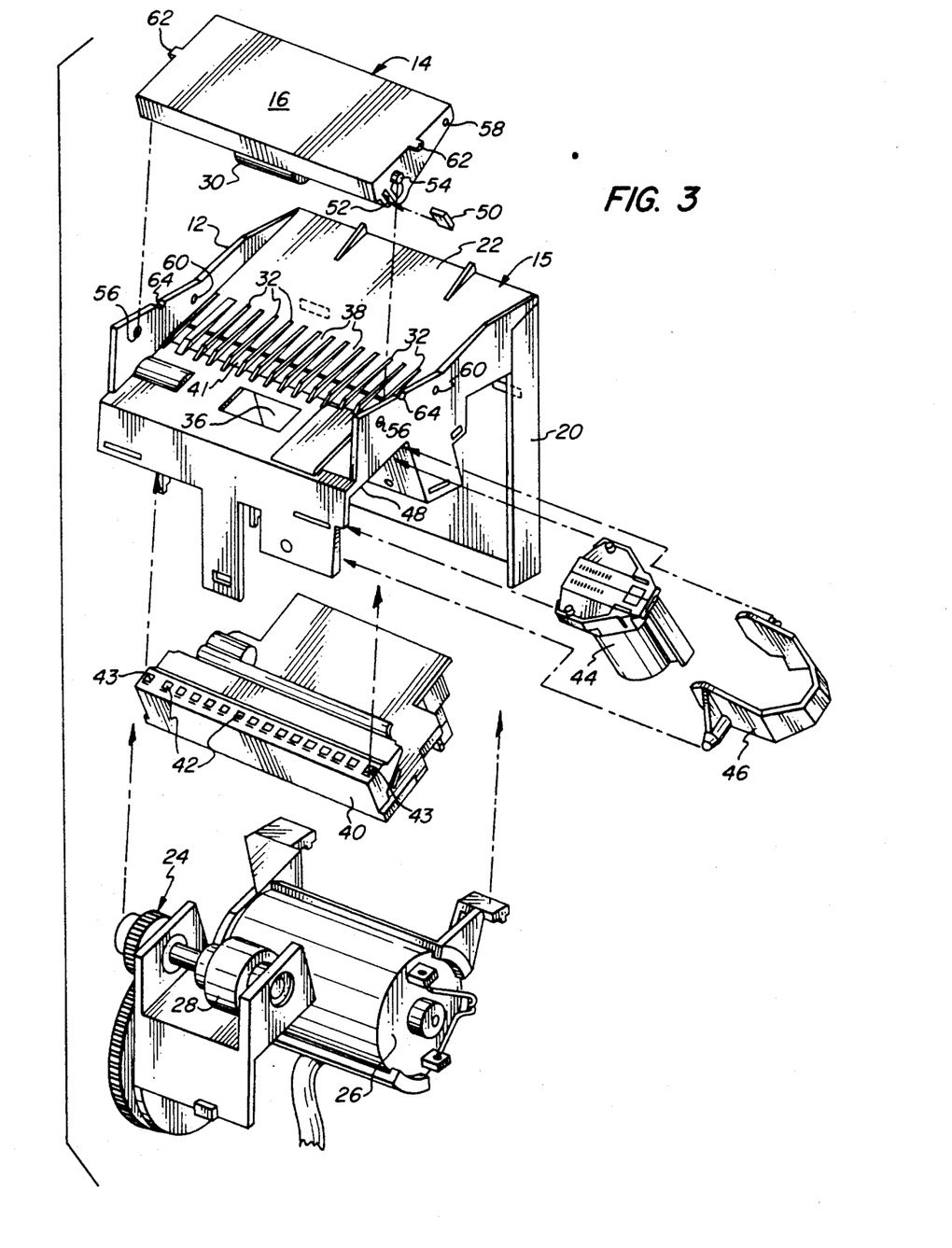
FIG. 3 is an exploded view of the major subassemblies of the card reader/validator.
Figure 4:
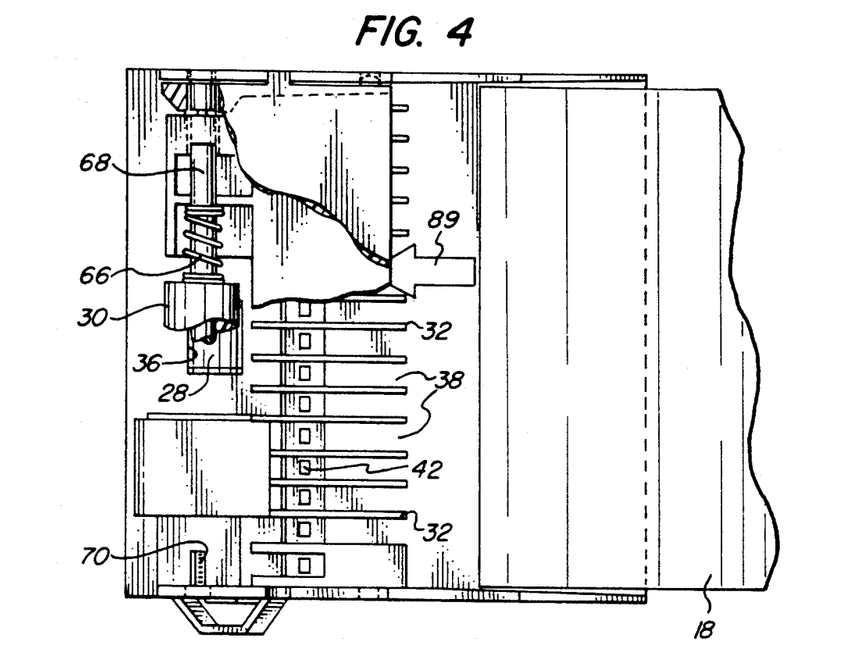
FIG. 4 is a top plan view of the card reader/validator with sections broken away to illustrate the platen assembly in greater detail.
Figure 5:
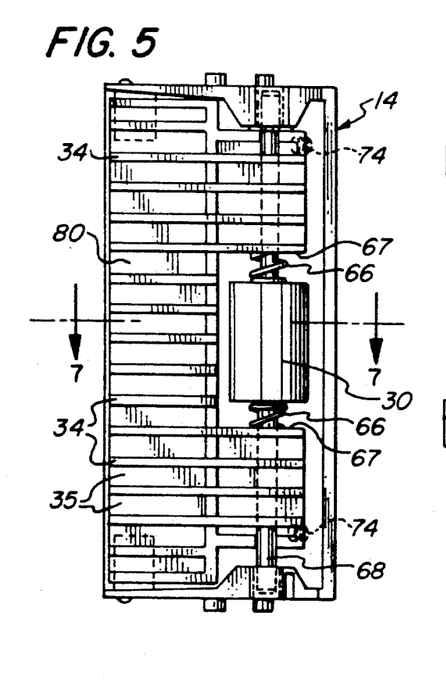
FIG. 5 is a bottom plan view of the platen assembly.
Figure 6:
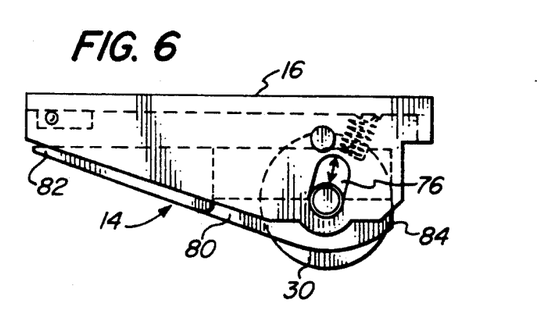
FIG. 6 is a side view of the platen assembly.
Figure 7:
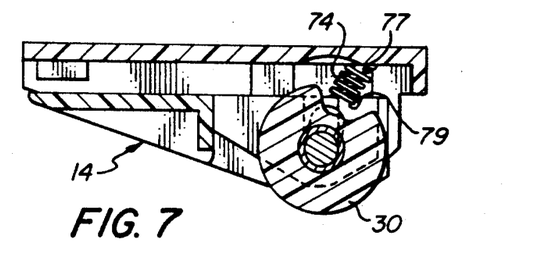
FIG. 7 is a cross-sectional view of the platen assembly taken along the lines 7—7 of FIG. 5.

As can be seen in FIG. 3, the paper drive surface of drive wheel 28 is aligned to project into paper path 22 via an opening 36. Platen assembly 14 is pivotally mounted via studs 54 projecting from cover 16 and corresponding holes 56 in housing 15. Stops 62 are provided on cover 16 for mating engagement with recesses 64 of housing 15 when the platen assembly is in the paper transport position. In the transport position, cover 16 is locked into place by nibs 58 that mate with detents 60 in housing 15.

The short paper path and narrow processing zone in the card reader/validator of the present invention reduce the possibility of paper jams. In the unlikely event that a paper jam occurs, platen assembly 14 can be pivoted up away from the paper path to expose processing zone 41 and enable the paper jam to be cleared. In an extreme situation, platen assembly 14 can be entirely removed from housing 15 by spreading the portions of paper transport section 12 adjacent studs 54 and lifting the platen assembly out of the housing. Removal of the platen assembly will also facilitate the cleaning of the paper drive mechanism.

Platen assembly 14 is illustrated in greater detail in FIGS. 4-10. The platen assembly includes pressure roller 30 for pressing paper against the paper drive surface of drive wheel 28. The platen assembly further includes a platen surface 80 for pressing paper against the paper path at processing zone 41. In the embodiment illustrated, the platen assembly also includes protective cover 16 into which platen surface 80 is pivotally mounted. It should be appreciated that a functionally equivalent platen surface can be mounted directly to housing 15, in which case protective cover 16 can be eliminated.

Platen surface 80 is a wedge shaped member having a rear portion 84 carrying pressure roller 30 via an axle 68. The platen surface tapers from rear portion 84 into a front edge 82 that forms a mouth 85 with the paper path 22 for receiving paper to be transported. Mouth 85 provides a larger opening when the platen surface is lifted away from the paper path than when the platen surface is biased against the paper path. This is most clearly illustrated by comparing FIG. 8 to FIG. 9.

Figure 8:
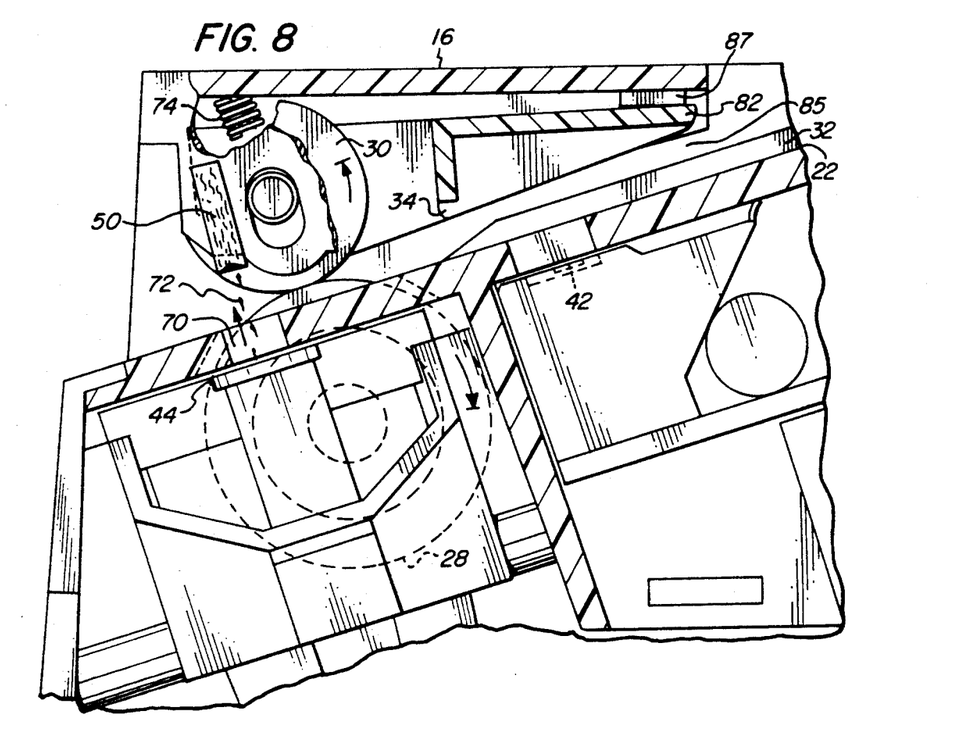
FIG. 8 is an enlarged side view of the card reader/validator with portions removed to illustrate the platen surface when lifted away from the paper path.

In FIG. 8, mouth 85 is opened to facilitate the insertion of a card or ticket by rotating drive wheel 28 in the clockwise direction indicated. This rotation of drive wheel 28 causes pressure roller 30 to rotate in a counterclockwise direction, lifting front end 82 of the platen surface away from paper path 22 due to the action of clutch springs 66 that bear against the sides of pressure roller 30 and edges 67 of platen surface 80. Springs 66 are selected to provide a desired breakaway force between pressure roller 30 and the platen surface 80 when drive wheel 28 is driven beyond the distance necessary to fully open mouth 85. The travel of the platen surface away from paper path 22, and thus the opening of mouth 85, is limited by a stop 87 in protective cover 16.

Figure 9:
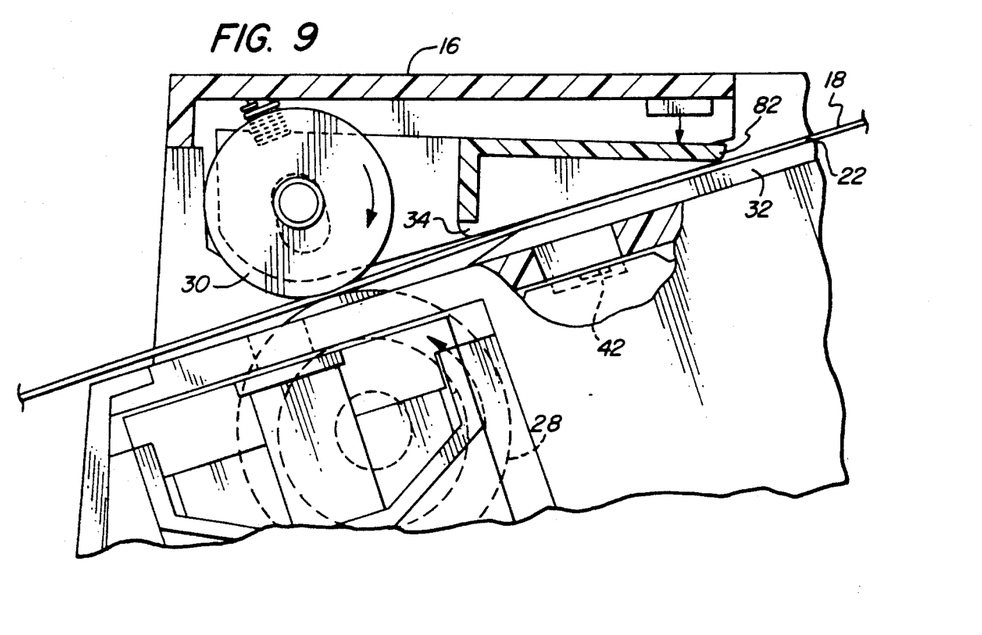
FIG. 9 is an enlarged side view of the card reader/validator with portions removed to illustrate the platen surface when it is biased toward the paper path with a piece of paper between the platen surface and paper path.

When a paper card or ticket is inserted into mouth 85, the leading edge of the paper is detected by detectors 42. This sends a signal to a motor control circuit that actuates motor 26 to advance drive wheel 28 in a counterclockwise direction as illustrated in FIG. 9. The counterclockwise rotation of drive wheel 28 causes pressure roller 30 to rotate in a clockwise direction, thereby biasing front edge 82 of the platen surface toward paper path 22 and closing mouth 85. At the same time, the counterclockwise rotation of drive wheel 28 illustrated in FIG. 9 draws paper 18 through the paper path.

In order to flatten the paper as it is transported through the card reader/validator, a plurality of parallel ribs 34 is provided on platen surface 80. Parallel ribs 34 define channels 35 in the platen surface. Ribs 34 and channels 35 are aligned with ribs 32 and channels 38, respectively, in the processing zone of paper path 22. Thus, paper traveling through the processing zone is held flat across channels 38 to facilitate the accurate reading of optical marks on the paper by sensors 42 and 43. Channels 35 in the platen surface provide a substantial contrast with the leading edge of a card or ticket inserted into the reader to facilitate the sensing of the leading edge by optical assembly 40. For example, if white paper is used, then the platen surface is advantageously molded from a dark plastic so that the interior of channels 35 is very dark with respect to the reflective white surface of the paper.

In order to accommodate different thickness papers, e.g., thin paper for wagering tickets and cardstock for the cards on which bets are placed, the rear portion 84 of platen surface 80 is mounted in a floating arrangement within protective cover 16. This is accomplished by retaining axle 68 in slots 76 of the protective cover and providing bias springs 74 between nibs 77 extending from the bottom surface of protective cover 16 and corresponding nibs 79 in the rear portion of platen surface 80.

In order to validate a wagering ticket that has been redeemed, an ink jet printhead 44 is provided. The ink jet printhead is a conventional component manufactured and sold by Hewlett-Packard Corporation, and is mounted in a printhead recess 48 provided in housing 15. The printhead 44 is locked into place within recess 48 by a locking clip 46.

When a wagering ticket is redeemed, it is run through card reader/validator 10 and a bar code or other indicia thereon is read by optical assembly 40. After verification of the ticket, printhead 44 is actuated to print a validation on the ticket indicating that it has been redeemed. The indication can comprise a word such as "PAID" or "CANCELED". Alternatively, ink from printhead 44 can be used to obliterate a bar code or other indicia on the edge of the wagering ticket to make it impossible to redeem the ticket a second time.

In a preferred embodiment, the wagering ticket is passed through paper path 22 in the direction of arrow 89 (FIG. 4) to read the ticket. Motor 26 is stopped before the trailing edge of the ticket passes beyond the reach of drive wheel 28. The ticket is held in this position while the data read from the ticket is communicated between the reader and a host computer. Once the ticket has been verified, motor 26 is actuated to rotate drive wheel 28 in an opposite direction, pushing the ticket back through paper path 22 in a direction opposite to that indicated by arrow 89, during which time printhead 44 can be actuated to validate the ticket. The direction of rotation of motor 26 can then be reversed again, so that the ticket is passed through the paper path in the direction of arrow 89 for exit from the card reader/validator.

In order to reliably operate ink jet printheads, they must be periodically purged of ink that collects in internal capillary tubes. The card reader/validator of the present invention provides a mechanism for purging the printhead. In particular, a wick 50 is mounted in a slot 52 of protective cover 16. At periodic intervals, when there is no paper in paper path 22, ink 72 from printhead 44 is sprayed through ink opening 70 for collection by wick 50, as schematically illustrated in FIG. 8. In this manner, the buildup of ink on the paper path surface is prevented, and problems with ink offset or ink contamination of the transport mechanism are thereby avoided.

Figures 10, 11:
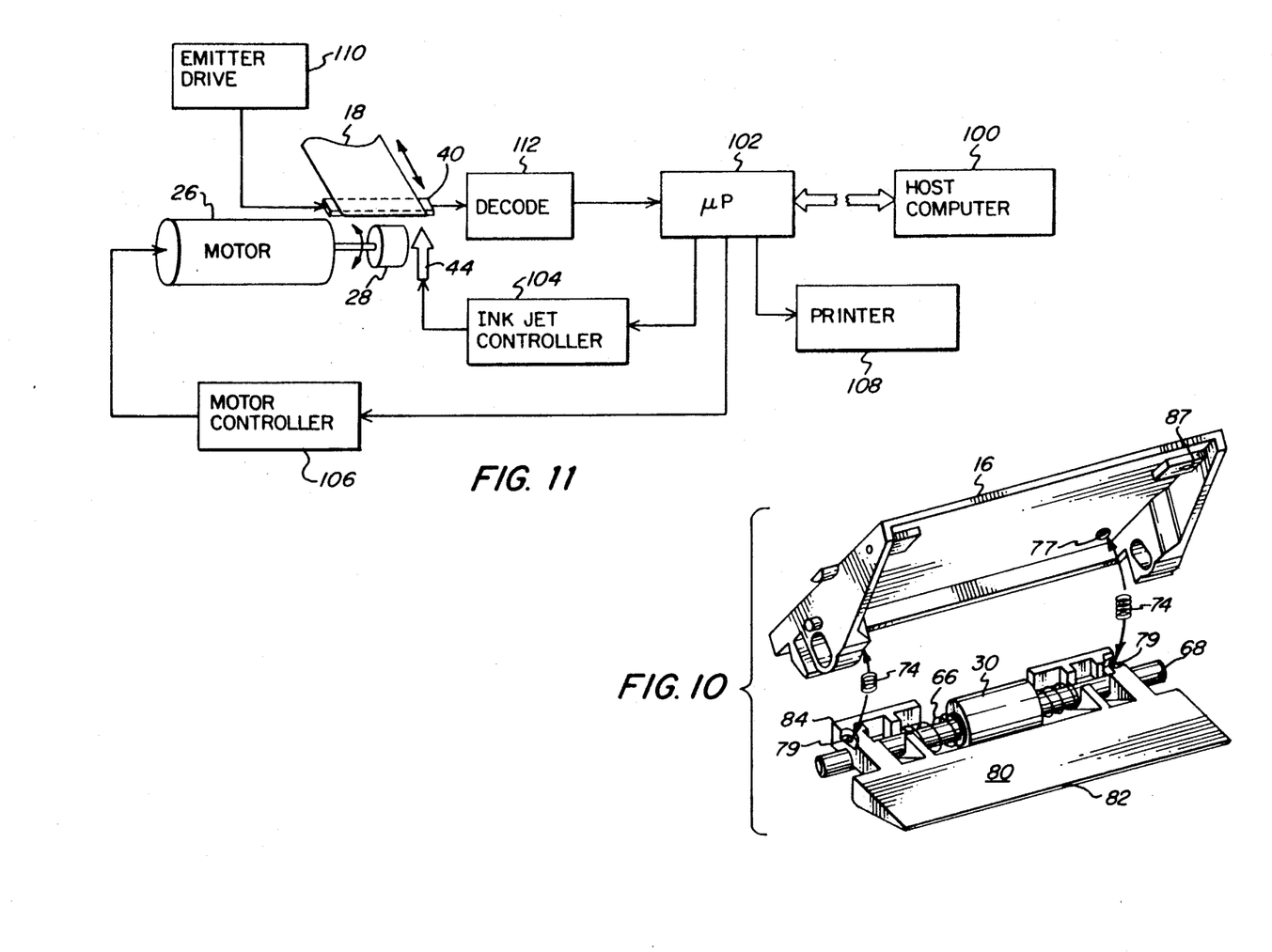
FIG. 10 is an exploded view illustrating the components of the platen assembly.
FIG. 11 is a block diagram illustrating control circuitry for a card reader/validator in accordance with the present invention.

The electronic control system for the card reader/validator is illustrated in FIG. 11. A microprocessor 102 provided in the card reader/validator communicates with a remote host computer 100. For example, optical marks read by the card reader/validator are transmitted to the host computer 100 for interpretation. The host computer 100 stores any bets placed by cards run through the card reader/validator, and also computes and authorizes the payoff of winning tickets run through the card reader/validator.

An emitter drive circuit 110 provides current to the LEDs or other light source in the optical assembly 40. Decoder circuitry 112 decodes electrical impulses generated by the photodetectors in optical assembly 40 that detect optical marks on a paper ticket or card 18. Decoder circuitry 112 also responds to the detection of a leading edge of paper by optical assembly 40. The decoded signals output from decoder circuitry 112 are processed by microprocessor 102. In the event that a leading edge is detected, microprocessor 102 outputs a motor control signal to motor controller 106, and actuates motor 26 to rotate drive wheel 28 in the direction necessary to bias the platen surface against the paper path and transport paper 18 therethrough. When a trailing edge of paper 18 is detected, microprocessor 102 can provide a signal to motor controller 106 that stops motor 26 to hold a wagering ticket between drive wheel 28 and pressure roller 30 as described above. Upon receipt of instructions from host computer 100, microprocessor 102 will then actuate motor controller 106 to rotate motor 26 in the direction(s) necessary to validate a ticket and/or eject paper 18 from the paper path.

When a wagering ticket is to be validated, microprocessor 102 provides a signal to ink jet controller 104 specifying the message or other indicia to be printed by printhead 44 on the edge of the ticket. The emitter drive, decode, motor controller, and ink jet controller circuitry are all conventional circuits. Microprocessor 102 includes software or firmware to implement the specific features of the present invention. A conventional printer 108 is coupled to microprocessor 102 for printing wagering tickets and other documents as directed by host computer 100.

It should now be appreciated that the present invention provides apparatus, such as a card reader/validator, for transporting a paper card or ticket across a processing zone. A unique platen assembly includes a pressure roller and platen surface that resist paper jams and enable any jams that do occur to be easily cleared. All of the subassemblies of a card reader/validator in accordance with the present invention can be fabricated to snap together. The housing, platen surface, platen assembly protective cover, optical assembly housing, and motor housing can all be conveniently molded from plastic.

Although the invention has been described herein in connection with a specific embodiment, those skilled in the art will appreciate that numerous modifications and adaptations may be made thereto without departing from the spirit and scope of the invention as set forth in the following claims.

What is claimed is:

1. Apparatus for transposing a paper card or ticket across a processing zone comprising:
   a housing including a paper path;
   means having a paper drive surface for driving paper through said paper path;
   a platen assembly including a pressure roller for pressing paper against said paper drive surface and a platen surface for pressing paper against said paper path at said processing zone; and
   means for pivotally mounting said platen assembly to said housing wherein said platen surface is biased toward said paper path when the paper drive surface advances in one direction and is lifted away from said paper path when the paper drive surface advances in the opposite direction.

2. Apparatus in accordance with claim 1 wherein said processing zone comprises an optical mark reader having a plurality of sensors for detecting marks provided along the length of paper traveling through said paper path.

3. Apparatus in accordance with claim 2 wherein said platen surface comprises a plurality of parallel ribs defining channels corresponding to said sensors;
   said ribs functioning to flatten paper traveling through said paper path when the platen surface is biased toward the paper path.

4. Apparatus in accordance with claim 3 further comprising:
   drive means for advancing said paper drive surface; and
   control means, responsive to said optical mark reader, for actuating said drive means to advance said paper drive surface upon the sensing of a leading edge of paper by said reader.

5. Apparatus in accordance with claim 4 wherein said plurality of channels have an interior surface that provides a substantial contrast with said leading edge to facilitate the sensing of said leading edge by said reader.

6. Apparatus in accordance with claim 1 wherein said mounting means enable said platen assembly to be snapped into and out of said housing.

7. Apparatus in accordance with claim 1 wherein said platen surface comprises:
   a wedge shaped member having a rear portion carrying said pressure roller and tapering into a front edge that forms a mouth with said paper path for receiving paper to be transported;
   said mouth providing a larger opening when said platen surface is lifted away from said paper path than when the platen surface is biased against said paper path.

8. Apparatus in accordance with claim 7 wherein said platen surface comprises a plurality of parallel ribs that function to flatten paper traveling through said paper path when the platen surface is biased toward the paper path.

9. Apparatus in accordance with claim 7 further comprising:

clutch means operatively associated with said pressure roller and wedge shaped member for allowing said pressure roller to continue to rotate after the platen surface has been lifted away from or biased against said paper path.

10. Apparatus in accordance with claim 1 further comprising:

a protective cover for said platen assembly;

means for mounting said cover to said housing; and means for pivotally mounting said platen assembly in said cover.

11. Apparatus in accordance with claim 10 wherein said protective cover is pivotally mounted to said housing.

12. A card reader and validator for use in wagering terminals or the like comprising:

a housing including a paper path;

a drive wheel having a paper drive surface projecting into said paper path;

a platen assembly including:

a pressure roller for pressing paper against the paper drive surface of said drive wheel, and a platen surface for pressing paper against said paper path at a processing zone located within said paper path; and means for pivotally mounting said platen assembly to said housing wherein said platen surface is biased toward said paper path when the drive wheel rotates in one direction and is lifted away from said paper path when the drive wheel rotates in the opposite direction.

13. Apparatus in accordance with claim 12 further comprising:

an ink jet for printing indicia on a portion of paper travelling through said paper path;

a wick for absorbing ink from said ink jet during a purge cycle; and means for mounting said wick to said platen assembly.

14. Apparatus in accordance with claim 12 wherein said platen surface comprises a plurality of parallel ribs that function to flatten paper traveling through said paper path when the platen surface is biased toward the paper path.

15. Apparatus in accordance with claim 14 wherein said ribs define channels that are aligned with a plurality of optical mark sensors in said processing zone.

16. Apparatus in accordance with claim 15 further comprising:

drive means for rotating said drive wheel; and control means, responsive to a leading edge sensor, for actuating said drive means to rotate said drive wheel upon sensing a leading edge of paper placed in said paper path.

17. Apparatus in accordance with claim 16 wherein said leading edge sensor comprises at least one of said optical mark sensors in said processing zone.

18. Apparatus in accordance with claim 12 wherein said platen surface comprises:

a wedge shaped member having a rear portion carrying said pressure roller and tapering into a front edge that forms a mouth with said paper path for receiving paper to be transported;

said mouth providing a larger opening when said platen surface is lifted away from said paper path than when the platen surface is biased against said paper path.

19. Apparatus in accordance with claim 18 wherein said platen surface comprises a plurality of parallel ribs that function to flatten paper traveling through said paper path when the platen surface is biased toward the paper path.

20. Apparatus in accordance with claim 18 further comprising:

clutch means operatively associated with said pressure roller and wedge shaped member for allowing said pressure roller to continue to rotate after the platen surface has been lifted away from or biased against said paper path.

21. A platen assembly for a paper transport apparatus comprising:

a pressure roller for pressing paper against a paper drive surface of said paper transport apparatus;

a platen surface for pressing paper against a paper path through which paper is transported; and means for pivotally mounting said platen surface to said paper transport apparatus wherein said platen surface is biased toward said paper path when the pressure roller is rotated in one direction and is lifted away from said paper path when the pressure roller is rotated in the opposite direction.

* * * * *